June 16, 1942.   T. W. TORR   2,286,519
HEATING SYSTEM
Filed Oct. 12, 1940   2 Sheets-Sheet 1

INVENTOR.
THOMAS W. TORR
BY Earl D. Chappell
ATTORNEYS

June 16, 1942.  T. W. TORR  2,286,519
HEATING SYSTEM
Filed Oct. 12, 1940  2 Sheets-Sheet 2

INVENTOR.
THOMAS W. TORR
BY Earl D. Chappell
ATTORNEYS.

Patented June 16, 1942

2,286,519

UNITED STATES PATENT OFFICE 2,286,519

HEATING SYSTEM

Thomas W. Torr, Dowagiac, Mich., assignor to
The Rudy Furnace Company, Dowagiac, Mich.

Application October 12, 1940, Serial No. 360,891

11 Claims. (Cl. 237—55)

This invention relates to improvements in heating systems.

The main objects of this invention are:

First, to provide an improved hot air heating system of simplified, economical construction having provision for effectively and uniformly supplying hot air to the rooms of a dwelling or other building regardless of the distance thereof from the heat generating unit of the system.

Second, to provide a system of the type described in which the heat generating unit itself may be a simple inexpensive one and still furnish adequate heating medium.

Third, to provide a system of the type described, wherein the heating capacity thereof is readily increased any desired amount without excessive expenditure should occasion warrant.

Fourth, to provide a heat exchange arrangement for a heating system associated with a loop duct hot air distributing system to effectively and uniformly circulate hot air through a building.

Fifth, to provide a system of the type described, wherein the heating medium supplied to a particular room may be readily increased if desired by a simple alteration of the connection of the take-off conduit therefor to the main heating duct.

Objects relating to details and economies of the invention will appear from the description to follow. The invention is defined and pointed out in the claims.

Preferred embodiments of the invention are illustrated in the accompanying drawings, in which.

Figures 1, 2:
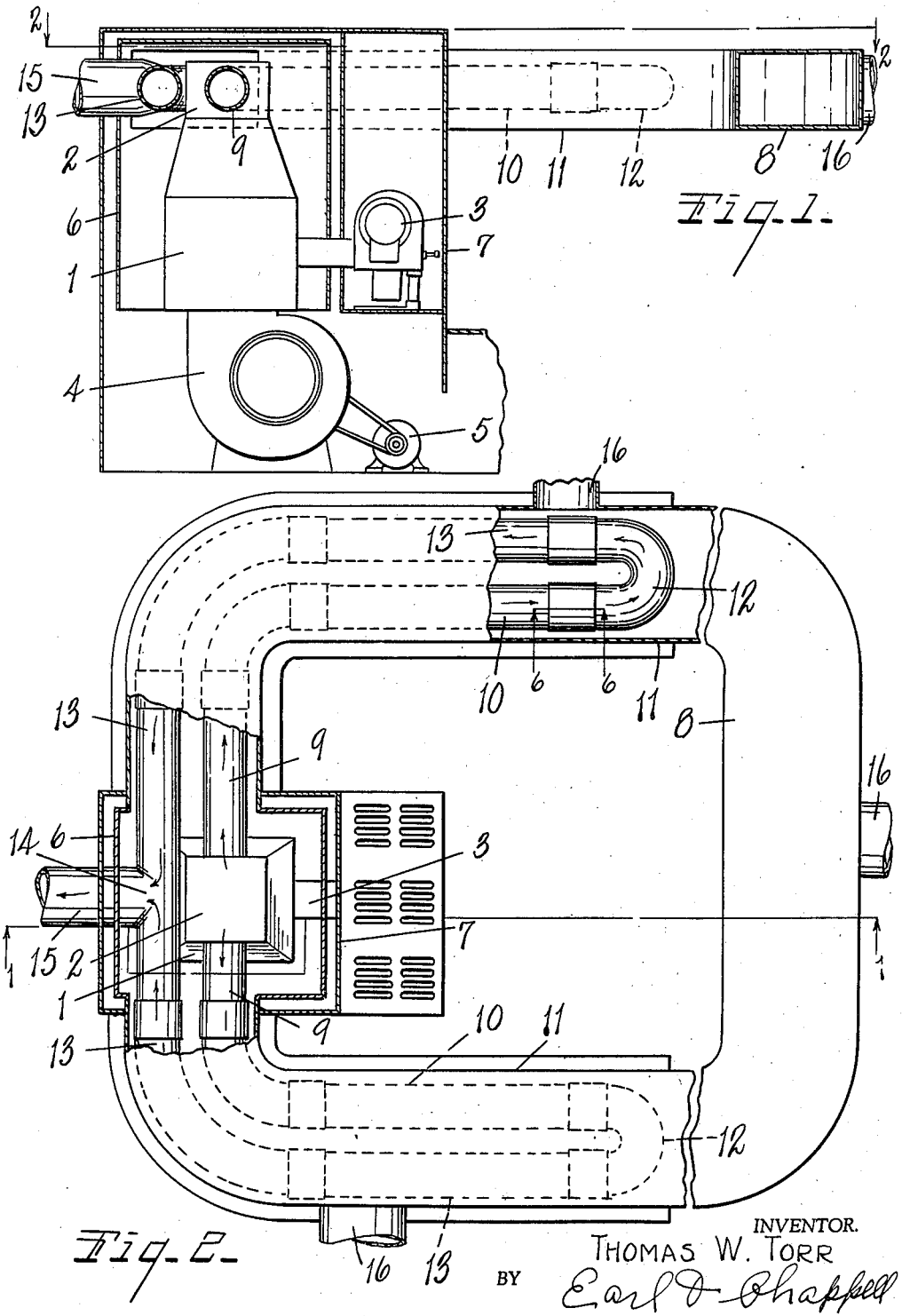
Fig. 1 is a fragmentary view in elevation sectioned on line 1—1 of Fig. 2, illustrating the construction of a heating system in accordance with the invention.
Fig. 2 is a plan view partially broken away and in section on line 2—2 of Fig. 1, more clearly illustrating the arrangement of the loop hot air duct in association with a looped, furnace connected heat exchange conduit or flue gas pipe for accomplishing an improved uniform transfer of heat from the surface thereof to air in the duct.

The present invention relates to improvements in hot air heating systems and in particular to an improved heat exchange structure adapted to be associated with a hot air furnace and with hot air ducts therefor having take-off conduits to the various rooms of a building, whereby the heat exchange from the radiating means is increased and made uniform regardless of the distance of the rooms from the furnace.

The design of present-day furnace is in general based on the assumption that the furnace or heat generating device must be as small and compact as possible with all of the heat exchange and other surfaces thereof arranged to retard the flow of combustion gases through the furnace in order that the stack temperature may be reduced as much as possible. At a result, the structure of the furnace per se is highly complex and expensive, and moreover, the capacity thereof is generally fixed and invariable.

The system of the present invention involves a directly opposite principle, namely, the employment of a furnace having merely a perfectly plain combustion chamber provided, of course, with a suitable oil or gas burner. The products of combustion rise directly to the top of the furnace and from there flow unimpeded for a substantial distance through a plain, inexpensive flue gas or heat exchange duct or pipe arranged in a distinctly novel and improved manner in a hot air loop or branch duct, prior to passing to the stack flue. Using an arrangement of this type, which operates in the manner to be hereinafter described, it is possible to increase the effective size of the furnace, i. e., its capacity, by the simple expedient of increasing the length of the aforesaid flue gas pipe and thereby cause the flue gases to travel for a greater distance interiorly of the air duct, transferring heat units uniformly to air in the latter, it being understood, of course, that a larger burner is installed in the furnace if this increase is effected.

Referring to the drawings, the reference numeral 1 in general indicates an oil or gas furnace, details of which have not been illustrated with particularity. This is a simple, inexpensive type furnace consisting mainly of a plain combustion chamber opening directly to the radiator head or dome 2 and having a suitable combustion element or unit. The usual automatically operable blower associated with such a furnace is indicated by the reference numeral 3. A suitable fan for distributing air in the duct system to be hereinafter described is designated 4 and is disposed underneath the furnace, being belt driven from a motor 5 to discharge into the sheet metal warm air furnace jacket or casing 6. A further sheet metal housing 7 serves to enclose all of the parts associated with the furnace.

The furnace has associated therewith a loop hot air duct 8 of the general type illustrated in the patent to Kluegel 1,588,746 of June 15, 1926, which opens at its ends into the furnace casing 6. In the present structure a fan 4 supplies air under pressure to the warm air casing and duct to thereby constitute the duct a balanced system functioning to assure the uniform supply of heating air to all parts of the duct and all rooms of the building supplied thereby, regardless of the distance thereof from the furnace.

Communicating with and extending from opposite sides of the radiator dome 2 of the furnace are a pair of radiator or flue gas pipes 9 each of which includes a pair of outgoing legs 10 extending into the side legs 11 of the hot air duct and disposed adjacent the inner side wall thereof. After extending a predetermined distance in the legs of the hot air duct, which distance is dependent upon the desired heat radiating capacity of the system, the radiator pipes are turned reversely at 12 and brought back along the outer side wall of the loop duct 8, as indicated at 13. These return portions 13 are parallel with the outgoing legs at all points thereof and the two return portions 13 communicate with one another at 14 and with a flue 15 which leads the relatively cool gases to the stack. Hot air take-off conduits 16 communicate with the duct 8 at spaced points therealong.

From the foregoing description, it will be appreciated that the outgoing legs 10 of the flue gas pipe or radiator are at a considerably higher temperature than the return legs 13, consequently, that the temperature of the air in the loop duct 8 adjacent the inner wall thereof is substantially higher than that adjacent the outer wall thereof. The take-off hot air conduits 16 for the individual rooms to be heated are all preferably arranged to communicate with the duct on the outer side thereof, hence as the products of combustion travel for a substantial distance through the legs of the radiator pipe, transferring heat to the air in the main duct, the room heating air is taken off from the relatively cool outer side of the main duct. Thus assurance is had that the portion of duct 8 and take-off conduits adjacent thereof, which are farthest from the furnace will be supplied with heated air in the first instance at least as effectively and usually more so than the conduits 16 near the furnace. In short, higher temperature air in the duct 8 is not immediately distributed out the first warm air conduits, thereby creating a possibility of non-uniform heating of the rooms of the building, but continues on down the loop system to the end thereof. I thereby accomplish the very desirable result of having as high or higher temperature at that part of the loop duct which is farthest away from the returns than is present in the duct closer to them.

The present radiator or heat exchange loop or flue does away with the pressure drop on the system. Moreover, the simplified less expensive furnace which is entailed in the present system does away with the temperature drop which has always been a difficult thing to deal with in installing either a branch duct or a loop system.

Furthermore, by reason of the fact that in the present system, the warmest air travels on the inside of the loop duct, it is apparent that any particular or unusual heating requirements of a particular room can be regulated merely by the manner in which the individual take-off for that room is connected to the main duct 8. Though I contemplate, as stated, that these conduits 16 be connected to the outside of the duct 8, in the event a higher temperature is desired than results from the preferred connection of the conduits, the latter can be connected on the top of the duct or to the inside wall thereof. Thus, if after initial installation of the system it is found that an individual room is not supplied with enough hot air, all that is required is that the corresponding conduit 16 be removed and its point of connection with the duct shifted toward the inside of the latter, at which point the temperature of the air in the duct is substantially higher.

The flexibility of the above described system in the matter of enabling the heating capacity of the furnace to be increased at small cost will likewise be apparent from the foregoing description. For example, after a furnace or heating system of the above type has been installed in a house for a few years, it may be desired to increase the heating capacity thereof so as to accommodate building additions and the like. To do this, all that is necessary is to simply increase the size of the fuel burner, if a gas furnace is employed, or the size of the nozzle in the case of an oil burner, or a fire pot of suitable type, and then add whatever length is desired to the combustion gas flue or radiator 9.

Figure 6:
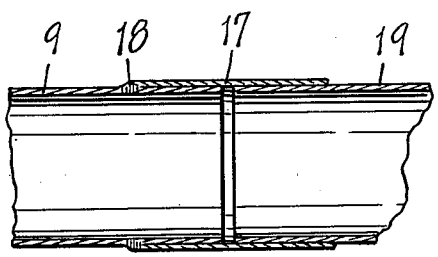
Fig. 6 is an enlarged fragmentary view in longitudinal section illustrating the manner of associating individual segments of the radiating element, whereby the length of the latter can be increased or diminished if desired.

In order to facilitate the addition of more length to the radiator elements, or the removal of length in the event less heating capacity is desired, I preferably form the same as illustrated in Fig. 6, in which the radiator pipe or flue 9, which is of a heavy gauge copper bearing sheet metal, has a tube 17 of the same metal telescoped over the open end thereof and welded thereto at 18 leaving a substantial length of the tube projecting from the radiator end. When a further section, in this case indicated by the reference numeral 19, is added, it is simply slipped into the end of the tube, thus making a perfectly tight slip joint which may be easily disassembled for adding still more length to the system if this should be desired at a later date.

Figure 3:
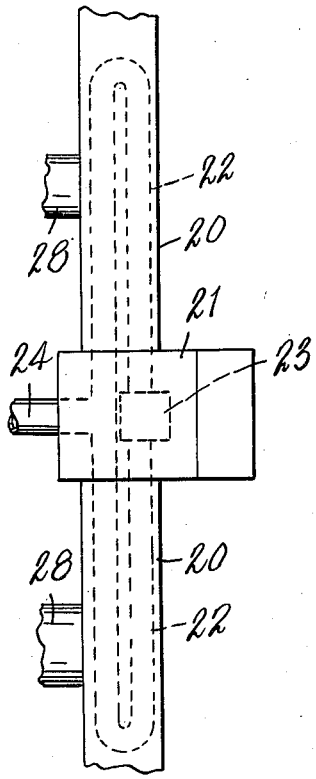
Figs. 3, 4 and 5 are fragmentary diagrammatic views illustrating further arrangements of the flue gas tubes or radiating surfaces of the furnace in accordance with the principle of the invention.
Figure 4:
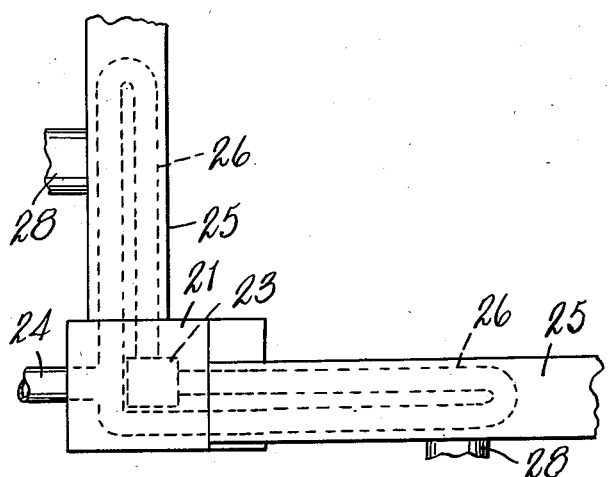
Figure 5:
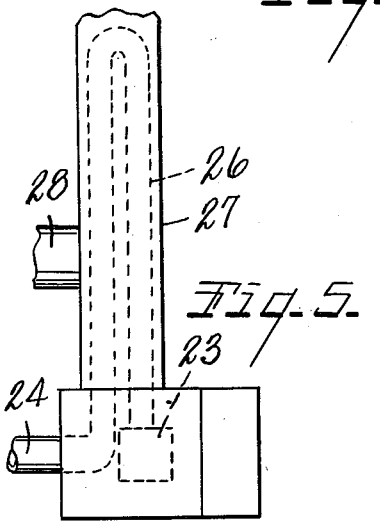

In Figs. 3, 4 and 5, I illustrate diagrammatically certain slightly modified embodiments of the invention which may be employed in case a branch duct system is employed. In Fig. 3, the branch air ducts 20 extend in opposite directions from the furnace casing 21 and the radiating elements 22 likewise extend oppositely into these ducts from the radiator dome 23 of the furnace, each being generally in a U-shape with the return ends thereof united at the opening to the stack flue 24. In Fig. 4, the air ducts 25 extend from the furnace at 90° to one another, with the radiator 26 arranged therein in the manner described above. In Fig. 5, the air duct 27 extends in only one direction from the furnace, the radiator pipe being arranged therein as above described. In each of the foregoing embodiments, the take-off heating ducts, which are indicated by the reference numeral 28 are preferably connected to the hot air ducts on the return side thereof for the purposes described in the preceding paragraphs, although in each case the position of the connection may be altered if desired to increase the heat supplied through the take-off conduits in special cases.

It will be perceived that I have provided a heating system which in any of the embodiments illustrated, and in further possible modifications which will occur to those skilled in the art, is of exceedingly simple, inexpensive construction. This system may be installed in a building of any size and the heating capacity thereof regulated as desired by the simple expedient of increasing or diminishing the size of the fuel burner or nozzle along with a corresponding increase or decrease in the length of the looped radiator surface disposed interiorly of the hot air conduit or duct. No matter what the input of the furnace is, the stack temperature can be reduced to practically any desired point within reason. No undue expense is involved, either in the construction of the furnace per se or the air or combustion circulating provisions associated therewith and, moreover, once installed in any capacity, altered heat requirements for any given room under any special circumstances or conditions may be readily taken care of at little cost.

I have illustrated and described my invention in embodiments which are very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. A heating system for buildings, comprising a furnace discharging hot gaseous products of combustion to a radiator dome in the top thereof, a hot air jacket surrounding said furnace, a loop-like hot air duct communicating with said jacket on opposite sides thereof, means for supplying air under pressure to said jacket and duct to uniformly distribute air throughout the latter under forced draft, loop-like radiators each having an outgoing leg opening to said radiator dome and extending for a substantial distance lengthwise and interiorly of the opposite legs of said duct and a return leg of substantial length extending for a substantial distance lengthwise and interiorly of the opposite legs of the duct and communicating with said outgoing leg at the end of the legs remote from the furnace, said outgoing and return legs being disposed in side by side parallel relation adjacent the inner and outer walls of the duct respectively whereby air in the latter adjacent the inner wall is heated to a greater degree than adjacent the outer, and a plurality of take-off conduits opening to said hot air duct at the outer side wall thereof whereby air interiorly of the duct is uniformly heated adjacent the inner side wall thereof prior to being taken off through said last named conduits.

2. A heating system for buildings, comprising a furnace discharging hot gaseous products of combustion to a radiator dome in the top thereof, a hot air jacket surrounding said furnace, a hot air duct communicating with said jacket, a loop-like radiator having an outgoing leg opening to said radiator dome and extending for a substantial distance lengthwise and interiorly of said duct and a return leg of substantial length extending for a substantial distance lengthwise and interiorly of the duct and communicating with said outgoing leg at the end of the legs remote from the furnace, said outgoing and return legs being disposed in side by side parallel relation adjacent opposite side walls of the duct respectively whereby air in the latter adjacent one wall is heated to a greater degree than adjacent the other, and a plurality of take-off conduits opening to said hot air duct at said other side wall thereof whereby air interiorly of the duct is uniformly heated adjacent said one side wall thereof prior to being taken off through said last named conduits.

3. A heating system for buildings, comprising a furnace discharging hot gaseous products of combustion to a radiator dome in the top thereof, a hot air jacket surrounding said furnace, a closed loop-like hot air duct communicating with said jacket, means for supplying air under pressure to said jacket and duct to uniformly distribute air throughout the latter, a loop-like radiator of sectional construction enabling the length thereof to be readily increased if desired, said radiator having an outgoing leg opening to said radiator dome and extending for a substantial distance lengthwise interiorly of said duct and a return leg of substantial length extending for a substantial distance lengthwise interiorly of the duct and communicating with said outgoing leg, said outgoing and return legs being disposed in side by side parallel relation adjacent the respective side walls of the duct whereby air in the latter adjacent the outgoing leg is heated to a greater degree than adjacent the return leg, and a plurality of take-off conduits opening to said hot air duct at points therealong remote from the outgoing leg whereby air interiorly of the duct is uniformly heated prior to being taken off through said last named conduits.

4. A heating system for buildings, comprising a furnace discharging hot gaseous products of combustion to a radiator dome in the top thereof, a hot air jacket surrounding said furnace, a closed loop-like hot air duct communicating with said jacket, means for supplying air under pressure to said jacket and duct to uniformly distribute air throughout the latter, a loop-like radiator of sectional construction enabling the length thereof to be readily increased if desired, said radiator having an outgoing leg opening to said radiator dome and extending for a substantial distance lengthwise interiorly of said duct and a return leg of substantial length extending side by side with said outgoing leg for a substantial distance lengthwise interiorly of the duct and communicating with said outgoing leg, and a plurality of take-off conduits opening to said hot air duct along the length thereof.

5. A heating system for buildings, comprising a furnace discharging hot gaseous products of combustion to a radiator member, a hot air jacket surrounding said furnace, a loop type hot air duct communicating with said jacket, a loop-like radiator having an outgoing radiator leg opening to and receiving said gaseous products from said radiator member and extending for a substantial distance lengthwise interiorly of said duct and a return leg of substantial length extending side by side with said outgoing leg for a substantial distance lengthwise interiorly of the duct and communicating at its outer end with said outgoing leg, and a plurality of take-off conduits opening to said hot air duct along the length thereof.

6. A heating system for buildings, comprising a furnace discharging hot gaseous products of combustion to a radiator dome in the top thereof, a hot air jacket surrounding said furnace, a closed loop-like hot air duct communicating with said jacket, means for supplying air under pressure to said jacket and duct to uniformly distribute air throughout the latter, a loop-like radiator having an outgoing leg opening to said radiator dome and extending for a substantial distance lengthwise interiorly of said duct and a return leg of substantial length extending side by side with said outgoing leg for a substantial distance lengthwise interiorly of the duct and communicating with said outgoing leg, and a plurality of take-off conduits opening to said hot air duct along the length thereof.

7. A heating system for buildings, comprising a furnace discharging hot gaseous products of combustion to a radiator member, means for supplying air to be heated, a loop type hot air duct communicating with said supply means, a loop-like radiator having an outgoing radiator leg opening to and receiving said gaseous products from said radiator member and extending for a substantial distance lengthwise interiorly of said duct and a return leg of substantial length extending side by side with said outgoing leg for a substantial distance lengthwise interiorly of the duct and communicating at its outer end with said outgoing leg, and a plurality of take-off conduits opening to said hot air duct along the length thereof.

8. A heating system of the type described including a jacketed furnace having a closed loop duct communicating therewith and adapted to circulate hot air from the furnace jacket, means for supplying air to be heated to the jacket under pressure, a looped radiator member associated with said duct comprising outgoing conduit legs communicating with and extending in opposite directions from the combustion chamber of the furnace and adapted to be supplied with hot products of combustion therefrom, return conduit legs disposed parallel to said respective outgoing legs and in communication therewith, said respective oppositely disposed outgoing and return legs extending side by side for substantial distances lengthwise and interiorly of the respective legs of the loop duct and being disposed with the outgoing conduit leg in each case adjacent one wall of the duct and the return leg adjacent the opposite duct wall, said return legs communicating with one another interiorly of the furnace jacket and with a stack flue, and a plurality of individual take-offs opening to said duct on the side thereof adjacent the return conduit leg whereby to remove heated air from said duct only after the air has been uniformly heated on the other duct side throughout the length thereof.

9. A heating system of the type described including a jacketed furnace having a closed loop duct communicating therewith and adapted to circulate hot air from the furnace jacket, a looped radiator member disposed in said duct comprising outgoing conduit legs communicating with and extending in opposite directions from the combustion chamber of the furnace and adapted to be supplied with hot products of combustion therefrom, return conduit legs disposed parallel to said respective outgoing legs and in communication therewith, said respective oppositely disposed outgoing and return legs extending side by side for substantial distances lengthwise and interiorly of the respective legs of the loop duct and being disposed with the outgoing conduit leg in each case adjacent one wall of the duct and the return leg adjacent the opposite duct wall, and a plurality of individual take-offs opening to said duct on the side thereof adjacent the return conduit leg whereby to remove heated air from said duct only after the air has been uniformly heated on the other duct side throughout the length thereof.

10. A heating system of the type described including a jacketed furnace having a generally horizontal branch duct communicating therewith and adapted to circulate hot air from the furnace jacket, a looped radiator member disposed in said duct comprising an outgoing conduit leg communicating with and extending from the combustion chamber of the furnace and adapted to be supplied with hot products of combustion therefrom, a return conduit leg disposed parallel to said outgoing leg and in communication therewith, said outgoing and return legs extending side by side for substantial distances lengthwise and interiorly of the duct and being disposed with the outgoing conduit leg adjacent one wall of the duct and the return leg adjacent the opposite duct wall, and a plurality of individual take-offs opening to said duct on the side thereof adjacent the return conduit leg whereby to remove heated air from said duct only after the air has been uniformly heated on the other duct side throughout the length thereof.

11. A heating system of the type described including a jacketed furnace having a closed loop duct communicating therewith and adapted to circulate hot air in two directions from the furnace jacket, a looped radiator member disposed in said duct comprising outgoing conduit legs communicating with and extending in two directions from the combustion chamber of the furnace and adapted to be supplied with hot products of combustion therefrom, return conduit legs disposed parallel to said respective outgoing legs and in communication therewith, said respective outgoing and return legs extending side by side for substantial distances lengthwise interiorly of the respective legs of the loop duct, said return legs communicating with one another interiorly of the furnace jacket and with a stack flue, and a plurality of individual take-off conduits opening to said duct along the length thereof to remove heated air from said duct.

THOMAS W. TORR.